(12) United States Patent  (10) Patent No.: US 6,527,639 B2
Suzuki  (45) Date of Patent: Mar. 4, 2003

(54) GAME SYSTEM WITH MUSICAL WAVEFORM STORAGE

(75) Inventor: Hideyuki Suzuki, Nagoya (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/740,197

(22) Filed: Dec. 18, 2000

(65) Prior Publication Data

US 2001/0007829 A1 Jul. 12, 2001

(30) Foreign Application Priority Data

Jan. 6, 2000 (JP) ........................................ 2000-005759

(51) Int. Cl.[7] ................................................. A63F 13/00
(52) U.S. Cl. ............................... 463/35; 381/17; 84/609
(58) Field of Search ............................. 463/35, 30, 43, 463/44; 273/148 B; 434/307, 308; 381/17, 18; 84/609–614

(56) References Cited

U.S. PATENT DOCUMENTS 4,574,391 A  * 3/1986  Morishima
4,622,877 A    11/1986 Strong
4,785,702 A    11/1988 Katoh
5,026,051 A  * 6/1991  Lowe et al.
5,067,079 A  * 11/1991 Smith, III et al.
5,225,619 A    7/1993  Sharp
5,390,938 A  * 2/1995  Takeya
5,393,073 A  * 2/1995  Best
5,735,743 A  * 4/1998  Murata et al.

* cited by examiner

Primary Examiner—Michael O'Neill
(74) Attorney, Agent, or Firm—Jordan and Hamburg LLP

(57) ABSTRACT

A game system includes: a waveform data storage device for storing waveform data of waveform pattern indicating tone varying in time-series; a game controller for executing a game based on a game program and for repeatedly reading out the waveform data from the waveform data storage device and outputting the read-out waveform data; and a music reproducing device for reproducing the waveform data outputted by the game controller as music. The game controller including a waveform data switching device for reading out, every time a predetermined time period passes, a waveform data having a different waveform pattern from the waveform data storage device, instead of the waveform data read out immediately before the predetermined time period passes.

5 Claims, 7 Drawing Sheets

GAME SYSTEM WITH MUSICAL WAVEFORM STORAGE

BACKGROUND OF THE INVENTION

1. Field of the Invention

The present invention relates to a game system capable of smoothly reproducing game music.

2. Description of Related Art

In general, a large-size home-use game systems uses a CD-ROM having large storage capacity as a storage medium for storing game music, and hence large storage capacity may be prepared for storing game music. A large-size game system of this kind can store whole music data from the start to the end of the game music and can store waveform-like natural and smooth game music data. Conventionally, a small-size portable game system also stores whole music data from the start to the end of the game music in the same manner as the above-mentioned large-size home-use game system.

However, unlike the large-size home-use game system, in the case of a small-size portable game system, its small data storage capacity limits wave-like smooth reproduction of game music.

SUMMARY OF THE INVENTION

It is an object of the present invention to provide a game system capable of reproducing natural and smooth game music.

According to one aspect of the present invention, there is provided a game system including: a waveform data storage device for storing waveform data of waveform pattern indicating tone varying in time-series; a game controller for executing a game based on a game program and for repeatedly reading out the waveform data from the waveform data storage device and outputting the read-out waveform data; and a music reproducing device for reproducing the waveform data outputted by the game controller as music, wherein the game controller including a waveform data switching device for reading out, every time a predetermined time period passes, a waveform data having a different waveform pattern from the waveform data storage device, instead of the waveform data read out immediately before the predetermined time period passes.

By the game system thus configured, the waveform data to be read out is switched every predetermined time period, and reproduced as game music (e.g., BGM and sound effect during the game progress). The tone of the waveform pattern changes in time-series in a constant time period. For example, the harmonic tone component varies in time-series (from the tone including much high-frequency component to the tone including much low-frequency component). Therefore, smooth and characteristic game music may be reproduced.

The waveform switching device may read out the waveform data from the waveform data storage device such that tone of music to be reproduced continuously changes. Thus, the waveform data maybe combined such that the tone of the game music is continuously changes.

The waveform data switching device may read out the waveform data from the waveform data storage device such that the waveform pattern continuously changes. Thus, the waveform data may be combined such that the waveform pattern of the game music continuously changes.

The game system may be a small-size portable game system. In this case, smooth and characteristic game music may be reproduced even by a portable small-size game system (such as a small game which can be put in a pocket of cloth and has small-storage capacity).

According to another aspect of the present invention, there is provided a computer readable storage medium carrying a game program which executes a game and repeatedly reads out waveform data of waveform pattern indicating tone varying in time-series the program controls a game apparatus to perform as a means for reading out, every time a predetermined time period passes, a waveform data having a different waveform pattern, instead of the waveform data read out immediately before the predetermined time period passes. Also by this medium, smooth and characteristic game music may be reproduced.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiment of the present invention will now be described below with reference to the attached drawings.

Figure 1:
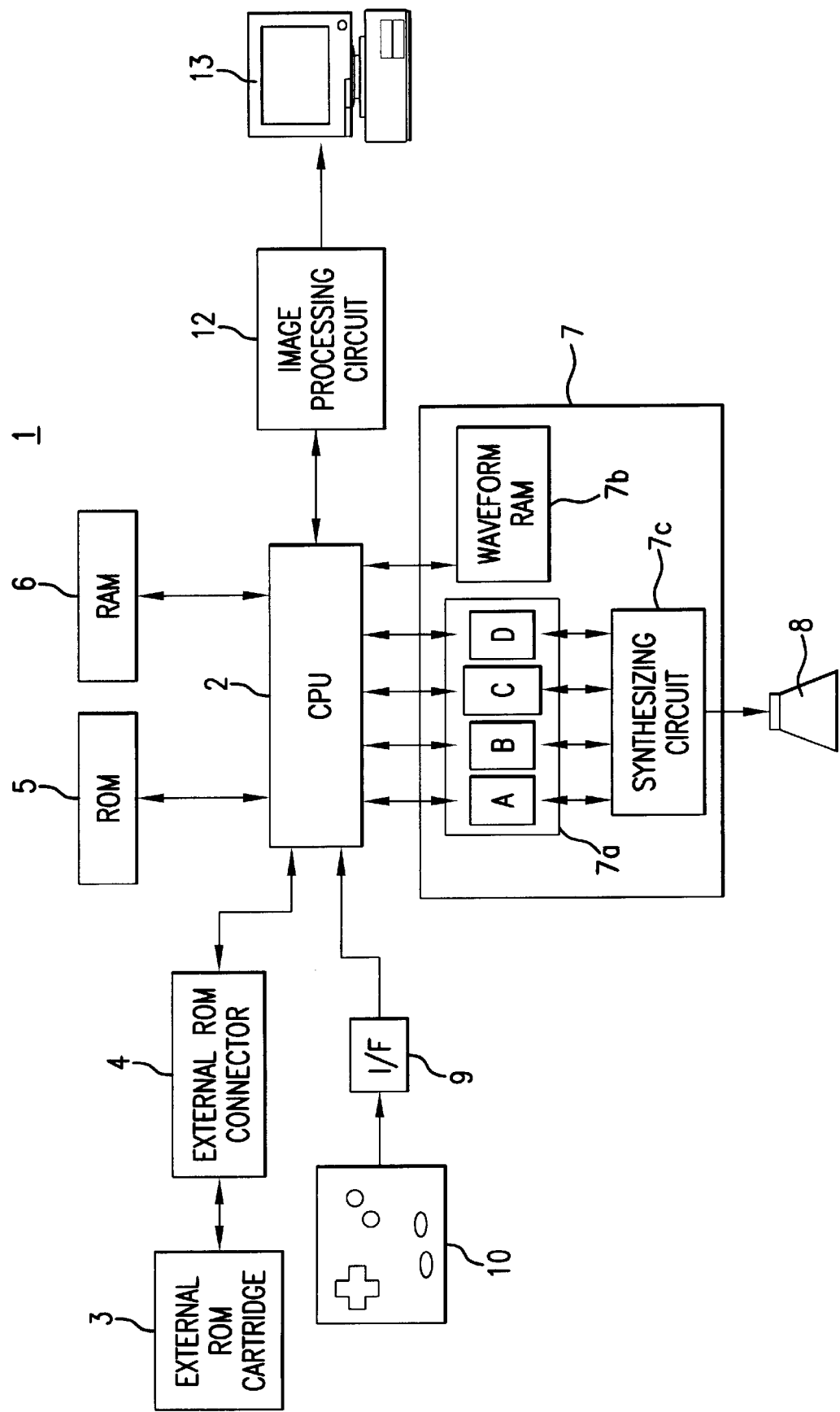
FIG. 1 is a diagram showing a schematic configuration of a game system according to the present invention.

FIG. 1 shows a schematic diagram of a game system 1 according to the present invention. As shown in FIG. 1, the game system 1 includes a CPU 2 which is mainly configured by a microprocessor unit. The CPU 2 performs total control of the game system 1 according to the game program stored in an external ROM cartridge 3 while monitoring the signal supplied from a controller 10 via an interface 9. Here, it is assumed that the game system 1 is a portable small-size game system.

The external ROM cartridge 3 is detachably connected to the CPU 2 via a connector 4 for an external ROM. The external ROM cartridge 3 accommodates a semiconductor memory (such as ROM or EP-ROM) which stores game control program, sound driver and various data in its plural memory areas.

Figure 2:
FIG. 2 is a diagram showing an example of score of game music.
Figure 3:
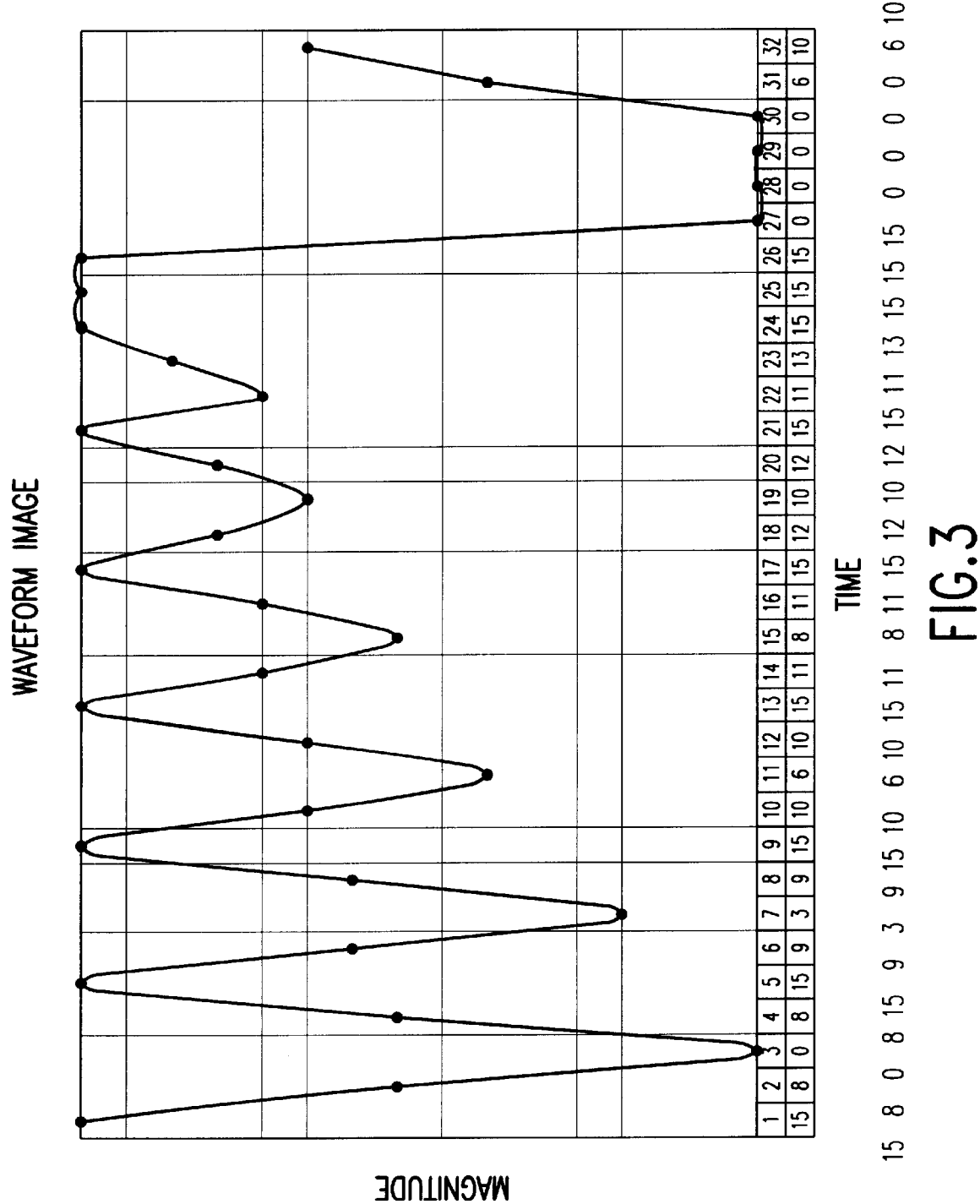
FIG. 3 is a diagram showing an example of waveform pattern of waveform data according to the present invention.

Various data stored in the external ROM cartridge 3 include game music to be reproduced by the speaker 8 during the progress of the game as well as image and character data to be shown on the image display device 13. The game music includes background music (BGM) and sound effect to be outputted by the speaker 8 during the game progress. The game music may be stored and reproduced as continuous music data, as shown in FIG. 2, or may be generated based on waveform data of approximately $\frac{1}{1000}$ second. The present invention is directed to the case in which game music is generated and reproduced from waveform data. FIG. 3 shows an example of waveform pattern of waveform data. The waveform pattern includes 32 data arranged in the time series (i.e., $\frac{1}{1000}$ second is divided into 32 data), and the magnitude (i.e., volume) of one data is expressed and set by one of 16 steps (i.e., 4 bits). In addition, as shown in FIG. 3, the waveform pattern may be set such that the tone (timbre) varies in time series during approximately $\frac{1}{1000}$ second. The variation of tone includes, for example, the variation of frequency band characterizing the tone, e.g., variation of harmonic tone (overtone) component from the tone including much high-frequency component to the tone including much low-frequency tone component.

The plurality of waveform data stored in the external ROM cartridge 3 have waveform patterns different from each other. The respective waveform data may be stored in separate files.

In addition, a ROM 5 and a RAM 8 serving as main storage devices are connected to the CPU 2. The ROM 5 stores operating system serving as program necessary for the whole operation control of the game system 1 as well as data necessary for the execution of the operating system. The RAM 6 includes a plurality of storage areas for temporarily storing various data during the game processing, and stores sound driver for outputting the waveform data to the audio output circuit 7, for example, into the work area.

The audio processing circuit 7 includes a port 7a, a waveform RAM 7b and a synthesizing circuit 7c. The port 7a includes an A-port, a B-port, a C-port and a D-port. These ports convert the game music data to music source signals and output them. The A-port and the B-port are pulse generating sound sources (PSG). The C-port is a simplified waveform generating sound source, and the D-port is a noise generating sound source. The waveform RAM 7 temporarily stores a plurality of waveform data stored in the external ROM cartridge 3. The CPU 2 reads out the waveform data stored in the waveform RAM 7b, and outputs them to the C-port, which is a simplified waveform generating sound source, with referring to the sound driver stored in the RAM 6. The C-port outputs the waveform with varying the length, the frequency and the level of the waveform pattern by means of registers.

In the present invention, the waveform data read out from the waveform RAM 7b is switched every predetermined time period. Namely, by gradually and continuously varying the waveform pattern of the waveform to be read out, the whole game music may be reproduced in smooth and characteristic manner. The waveform data to be read out may be switched and outputted such that the tone (timbre) of the game music continuously varies. It is noted that the respective waveform data is assigned with number corresponding to the order according to which those waveform data are read out (if the waveform data is stored in a file, the number is assigned to each file).

The synthesizing circuit 7b converts the sound source signal outputted by the port 7a to an analog sound source signal, and outputs it to the speaker 8 as the game music. To the CPU 2, the controller 10 is connected via the interface 9. The controller 10 is an input device which outputs a signal corresponding to the manipulation by a user. To the CPU 2, the image display device 13 is connected via the image processing circuit. 12. The image processing circuit 12 converts the image data to a video signal according to the instruction by the CPU 2, and outputs the video signal to the image display device 13 at the predetermined timings.

Figure 4:
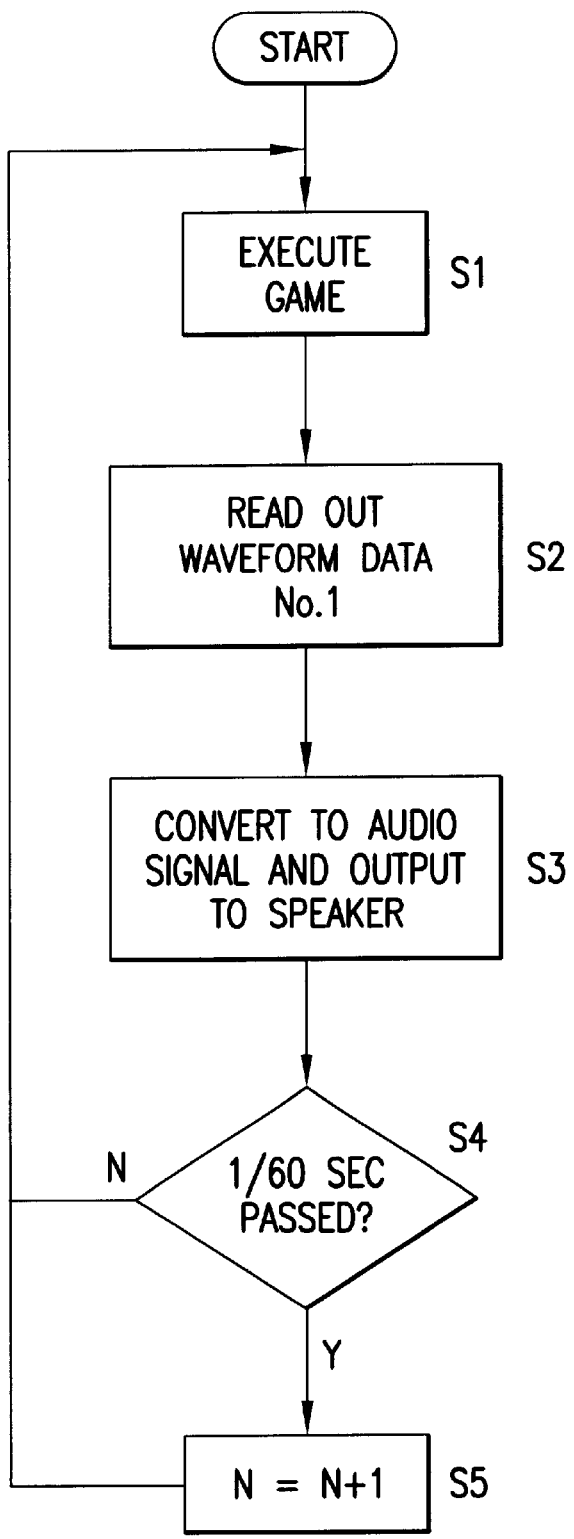
FIG. 4 is a flowchart showing a processing to reproduce game music based on waveform data according to the present invention.
Figure 5:
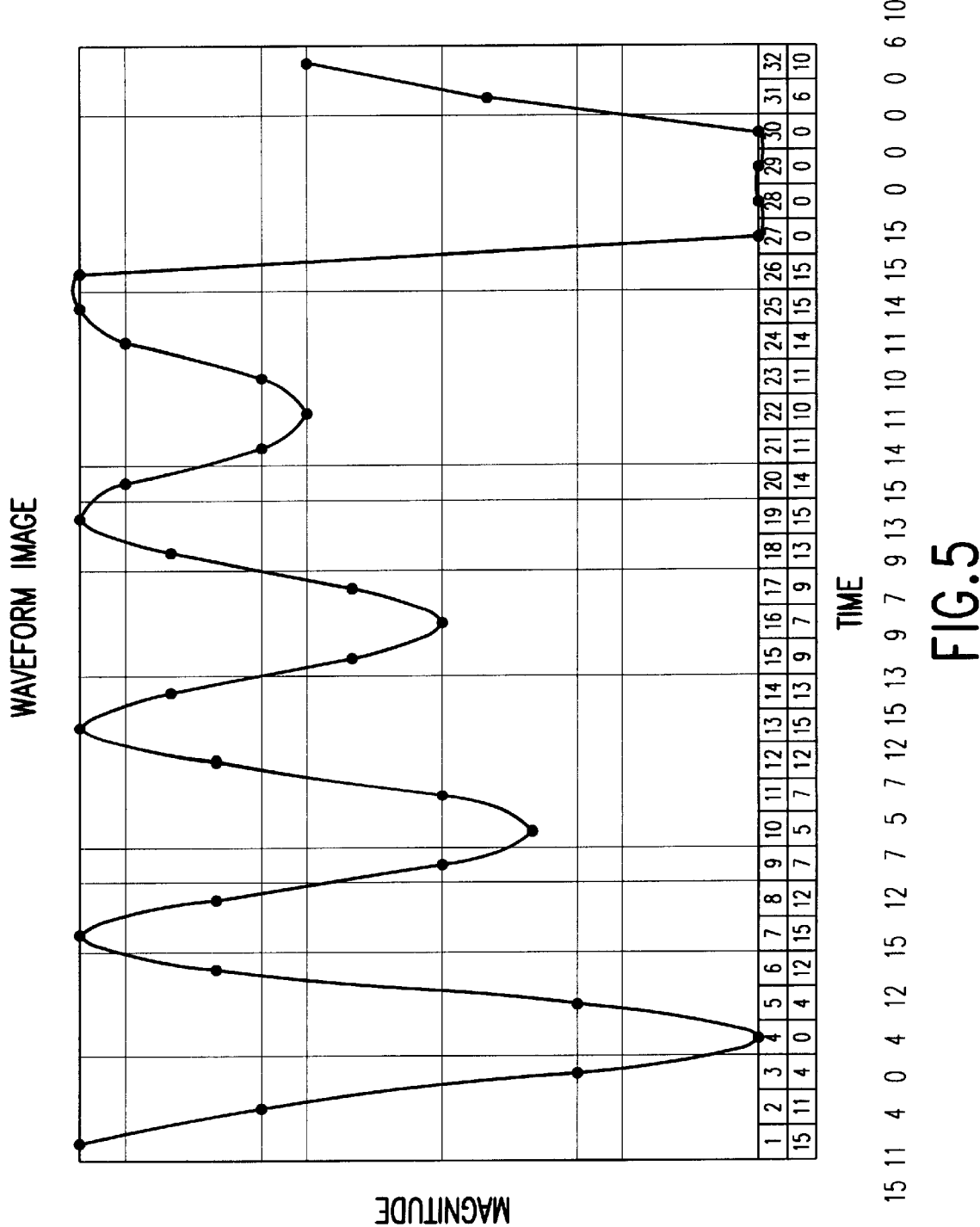
FIG. 5 is a diagram showing an example of waveform pattern of waveform data according to the present invention.

Next, by referring to FIG. 4, the description will be given of the processing at the time when the game music is reproduced by using the waveform data. When the game program is executed, the CPU 2 reads out a plurality of waveform data from the external ROM cartridge 3, and stores them in the waveform RAM 7b. Then, the CPU 2 executes the game program with referring to the instruction inputted by the user via the controller 10 (S1). Then, the CPU 2 reads out the waveform data of file No. 1, e.g., the waveform data as shown in FIG. 3, from the waveform RAM 7b (S2), and outputs the waveform data to the speaker 8 via the audio processing circuit 7 with referring to the sound driver stored in the RAM 6 (S3). The read-out of the waveform data is repeated for a predetermined time period from the read-out start timing, for $\frac{1}{60}$ second, for example. Then, the CPU determines whether or not $\frac{1}{60}$ second has passed after the read-out start timing (S4). If $\frac{1}{60}$ second has passed after the read-out start timing, the file number of the waveform data is incremented (S5). Then, the CPU 2 reads out the waveform data of file No. 2, e.g., the waveform data as shown in FIG. 5, and outputs it to the speaker 8 via the audio processing circuit 7.

Figure 6:
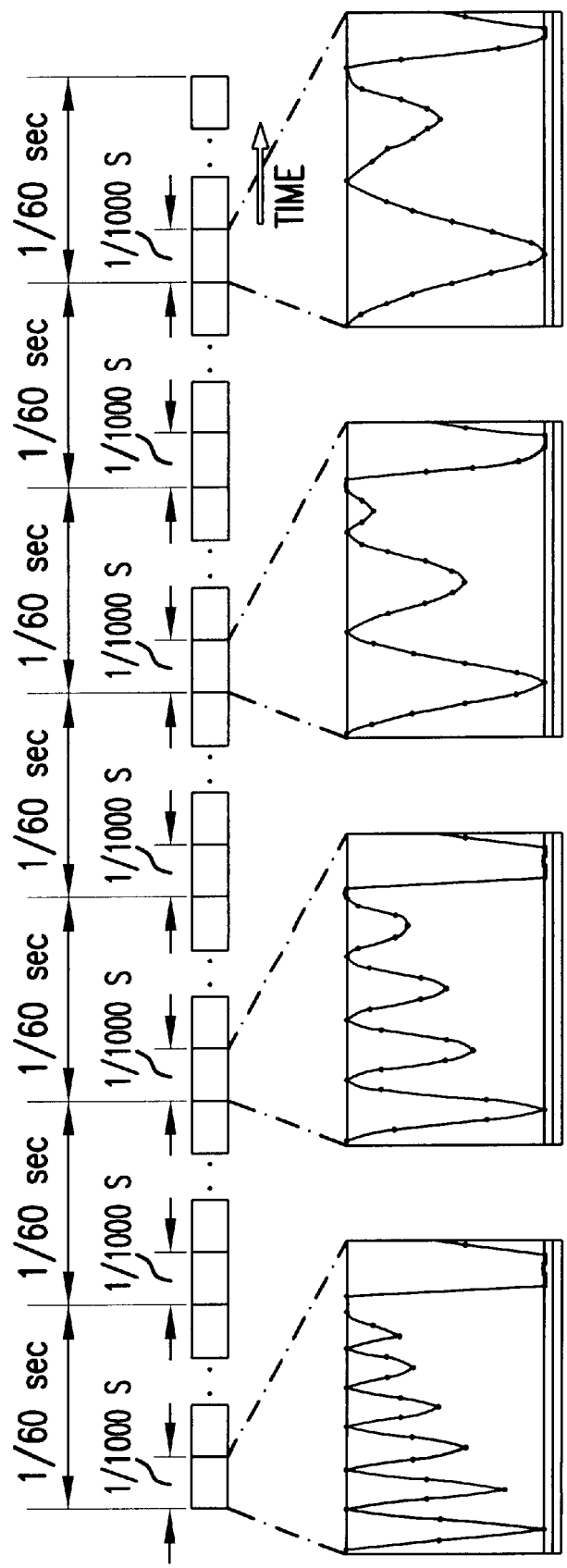
FIG. 6 is a diagram showing the manner in which waveform to be read out is varied by game music reproduction processing of the present invention.

Thus, every time $\frac{1}{60}$ second passes, the waveform data to be read out is switched. In FIG. 6, since the time width of a single wave (wave for one period) included in the waveform pattern becomes larger every time the waveform data to be read out is switched, the sound changes from the sound including much high-frequency component to the sound including much low-frequency component. In this way, it is possible to reproduce game music of smooth as a whole and characteristic.

Figure 7:
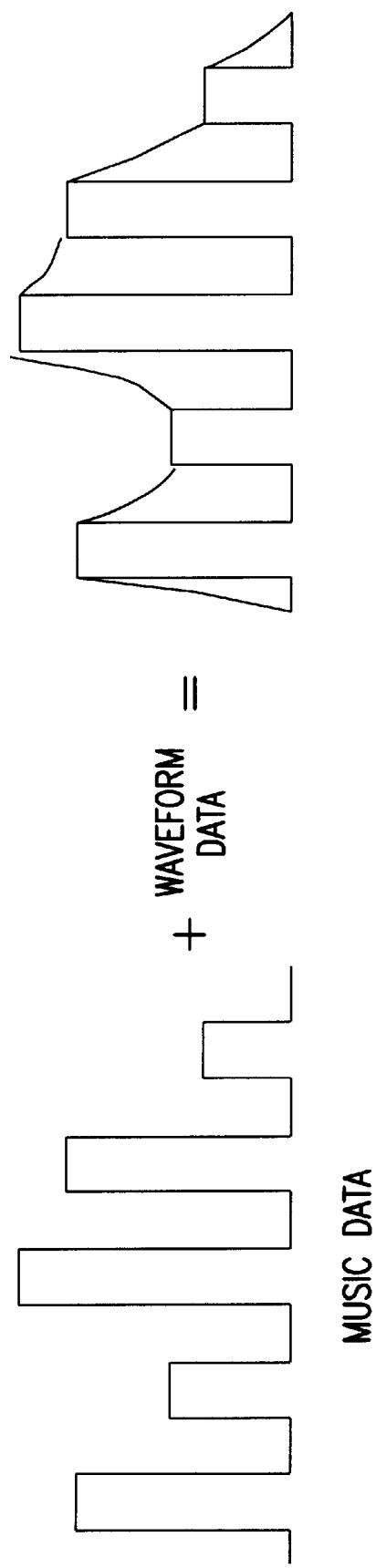
FIG. 7 is a diagram showing the manner of incorporating waveform data between sounds of series of game music.

Alternatively to the above described embodiment, the waveform data may be incorporated between the sounds (e.g., the reference numerals 20 and 21) of the continuous game music shown in FIG. 2. By this, the sound smoothly changes as shown in FIG. 7.

Further, the present invention is applicable to the game of any genre, such as role-playing game, simulation game, action game and the like. Still further, the present invention may be implemented in a portable, but large-size home-use game system as well as the small-size portable game system. The present invention may also be implemented in a game system utilizing a network.

As described above, according to the present invention, smooth and characteristic game music may be reproduced even in a small-size portable game system.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

What is claimed is:

1. A game system comprising:
    a waveform data storage device for storing waveform data of waveform pattern indicating tone varying in time-series;
    a game controller for executing a game based on a game program and for repeatedly reading out the waveform data from the waveform data storage device and outputting the read-out waveform data; and a music reproducing device for reproducing the waveform data outputted by the game controller as music, wherein the game controller comprising a waveform data switching device for reading out, every time a predetermined time period passes, a waveform data having a different waveform pattern from the waveform data storage device, instead of the waveform data read out immediately before the predetermined time period passes.

2. A game system according to claim 1, wherein the waveform switching device reads out the waveform data from the waveform data storage device such that tone of music to be reproduced continuously changes.

3. A game system according to claim 1, wherein the waveform data switching device reads out the waveform data from the waveform data storage device such that the waveform pattern continuously changes.

4. A game system according to claim 1, wherein the game system is a small-size portable game system.

5. A computer readable storage medium carrying a game program which executes a game and repeatedly reads out waveform data of waveform pattern indicating tone varying in time-series, the program controls a game apparatus to perform as a means for reading out, every time a predetermined time period passes, a waveform data having a different waveform pattern, instead of the waveform data read out immediately before the predetermined time period passes.

* * * * *